(12) United States Patent
Onuma (10) Patent No.: US 6,570,669 B1
(45) Date of Patent: May 27, 2003

(54) INFORMATION PROCESSING APPARATUS, INFORMATION PROCESSING METHOD, AND COMPUTER-READABLE STORAGE MEDIUM STORING PROGRAM FOR CONTROLLING THE SAME

(75) Inventor: Nobuo Onuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,056

(22) Filed: Jul. 28, 1999

(30) Foreign Application Priority Data

Mar. 5, 1999 (JP) .............................. 11-058714

(51) Int. Cl.⁷ .......................... G06K 15/02; G06F 13/00
(52) U.S. Cl. .................................... 358/1.15; 358/1.14
(58) Field of Search ............................ 358/1.15, 1.17, 358/1.18, 1.14, 1.13, 404, 405, 413, 438, 439; 710/7–9, 19–21, 31–34, 46–47

(56) References Cited

U.S. PATENT DOCUMENTS 6,128,096 A * 10/2000 Furuya et al. ............. 358/1.17
6,304,335 B1 * 10/2001 Furuja et al. ............. 358/1.15

* cited by examiner

Primary Examiner—Gabriel Garcia
Assistant Examiner—Douglas Tran
(74) Attorney, Agent, or Firm—Fitzpatrick, Cella, Harper & Scinto (57) ABSTRACT

Even under an environment where a reset signal cannot be issued, a print stop can be realized from a host computer for print data during the printing in a printer. When a data transmission controller (5) parses the print data and generates transmission data, if a print stop command is detected, optimum complementary data is generated in accordance with delimiter information of the transmission data and the complementary data is transmitted to a printer (8) through a data transmission processor (6) subsequently to the transmission data.

22 Claims, 4 Drawing Sheets

PRINT DATA BLOCK

FIG. 3

PRINT DATA BLOCK   COMPLEMENTARY DATA

FIG. 4

PRINT DATA BLOCK   COMPLEMENTARY DATA

MEM MAP OF MEM MEDIUM

| DIRECTORY |
|---|
| FIRST DATA PROCESSING PROGRAM PROGRAM CODES FOR FLOWCHART OF FIG.5 |
|  |

INFORMATION PROCESSING APPARATUS, INFORMATION PROCESSING METHOD, AND COMPUTER-READABLE STORAGE MEDIUM STORING PROGRAM FOR CONTROLLING THE SAME

BACKGROUND OF THE INVENTION

1. Field of the Invention

The invention relates to an information processing apparatus and an information processing method for communicating with a printer under a print environment where a hard reset signal cannot be issued through a predetermined communication medium for software operating on the OS and transmitting and controlling print data and relates to a computer-readable storage medium which stores a program for controlling such an apparatus.

2. Related Background Art

Hitherto, a reset signal line is generally prepared for a Centronics interface for connecting a serial printer such as an ink jet printer and a computer and the printer can be reset in a hardware manner by turning on/off a reset signal. In the USB (Universal Serial Bus) or IEEE1394, a function to initialize a device exists at a protocol command level, and the printer can be reset in a hardware manner by outputting a reset command as a system.

Particularly, under an environment using Windows95 (trade name of Microsoft Co., Ltd. in U.S.A.) as an OS of a computer, if the user wants to stop the printing during the printing, a reset signal or a reset command is issued from utility software or the like to the OS and the printer is forcedly reset by using the reset signal or reset command. In this instance, if the printing is being performed, a paper is forcedly ejected and all of values which have been set so far in the printer are also returned to initial values. The next printing, therefore, can be normally monitored by such an initializing process.

In the recent OS such as WindowsNT (trade name of Microsoft Co., Ltd. in U.S.A.) or the future Windows2000, the OS has an environment where a plurality of users share a computer, there is a danger such that if the reset signal is unnecessarily turned on/off by the user or the output of the reset command is permitted, a printing process of the other person is stopped, and the like. Therefore, for the software which operates on the OS, the use of the reset signal is inhibited, thereby disabling the user to use it.

Therefore, under such an OS environment, if the user wants to stop the printing during the printing by a serial printer which is locally connected via a Centronics I/F, USB, or the like, in order to delete the data remaining in the printer on the halfway of the printing and to reset the print set items (output mode setting such as normal paper output mode, photograph mode, or the like) in the print job, a power supply of the printer apparatus main body has to be turned on/off by the user.

Under the OS environment where no reset signal cannot be issued as mentioned above, the power supply of the printer apparatus main body has to be turned on or off like a conventional manner. That is, in this instance, since there is a possibility that the printer is waiting for reception of continuance of the unfinished command, if the user has already instructed the next print job to print, the head portion of the next print data is mistaken as a continuance of the next print job and performs an unnecessary trash printing. Or, even if the command has been finished, since a form feed command is not received, the paper is not ejected but the next printing is started on the halfway of the paper.

Since an initializing process is insufficient, the values set in the printer are not initialized due to the print data whose printing was stopped, so that those set values are taken over for the next print data. There is, consequently, a situation such that a printing process for a normal paper is performed to an expensive glossy paper and a desired picture quality cannot be obtained.

SUMMARY OF THE INVENTION

The invention is made to solve the foregoing problems and it is an object of the invention to provide an information processing apparatus and an information processing method in which even under an environment where when print data is parsed and transmission data is generated, if a print stop command is detected, optimum complementary data is generated in accordance with delimiter information of the transmission data, and the complementary data is transmitted to a printer subsequently to the transmission data, so that a reset signal cannot be issued, a print stop can be realized from a host computer for the print data on the halfway of the printing in the printer, and it is possible to prevent an inconvenience such that when a print stopping process of the print data is performed to the printer in which print set values which are used are set every print data, the previous set values are taken over for the next print data, and to provide a computer-readable storage medium which stores a program for controlling such an apparatus.

According to a first aspect of the present invention, there is provided an information processing apparatus for communicating with a printer and transmitting print data under a print environment where a hard reset signal cannot be issued through a predetermined communication medium for software which operates on the OS, comprising: detecting means (data transmission controller 5 shown in FIG. 1) for, when print data which is generated on the basis of a drawing command is divided on a predetermined unit basis and transmitted to the printer, parsing the divided print data and detecting delimiter information of block data which is transmitted; and complementary data generating means (data transmission controller 5 shown in FIG. 1) for, when a print stop command is issued, finishing the block data to be transmitted on the basis of the delimiter information which is detected by the detecting means and generating complementary data to normally finish a printing process of the printer.

According to a second aspect of the present invention, the information processing apparatus further has print data generating means (print data generator 3 shown in FIG. 1) for receiving the drawing command through the OS and generating the print data comprising commands which can be interpreted by the printer on the basis of the drawing command.

According to a third aspect of the present invention, the information processing apparatus further has transmission processing means (data transmission processor 6 shown in FIG. 1) for transmitting the complementary data generated by the complementary data generating means subsequently to the block data.

According to a fourth aspect of the present invention, in the information processing apparatus, the complementary data generating means further has discriminating means for discriminating whether the block data has normally been finished or not on the basis of the delimiter information which is detected by the detecting means, and when it is determined by the discriminating means that the block data is not normally finished, the complementary data generating means generates the complementary data.

According to a fifth aspect of the present invention, in the information processing apparatus, when the discriminating means determines that the block data lack in parameters, the complementary data generating means generates the necessary number of parameters and a paper ejection command.

According to a sixth aspect of the present invention, in the information processing apparatus, when the discriminating means determines that the block data lack in a command ID and parameters, the complementary data generating means generates a predetermined command which is not interpreted by the printer, parameters, and a paper ejection command.

According to a seventh aspect of the present invention, in the information processing apparatus, the complementary data generating means further generates an initializing command for setting the printing.

According to an eighth aspect of the present invention, in the information processing apparatus, the print data generating means is a printer driver, and the detecting means and the complementary data generating means are a language monitor.

According to a ninth aspect of the present invention, there is provided an information processing method of communicating with a printer and transmitting and controlling print data under a print environment where a hard reset signal cannot be issued through a predetermined communication medium for software which operates on the OS, comprising: a detecting step (step S4 shown in FIG. 5) of, when print data which is generated on the basis of a drawing command is divided on a predetermined unit basis and transmitted to the printer, parsing the divided print data and detecting delimiter information of block data which is transmitted; and a complementary data generating step (step S11 shown in FIG. 5) of, when a print stop command is issued, finishing the block data to be transmitted on the basis of the delimiter information which is detected in the detecting step and generating complementary data to normally finish a printing process of the printer.

According to a tenth aspect of the present invention, the information processing method further has a print data generating step (not shown) of receiving the drawing command through the OS and generating the print data comprising commands which can be interpreted by the printer on the basis of the drawing command.

According to an eleventh aspect of the present invention, the information processing method further has a transmission processing step (step S12 shown in FIG. 5) of transmitting the complementary data generated in the complementary data generating step subsequently to the block data.

According to a twelfth aspect of the present invention, in the information processing method, the complementary data generating step further has a discriminating step (step S5 shown in FIG. 5) of discriminating whether the block data has normally been finished or not on the basis of the delimiter information which is detected in the detecting step, and when it is determined in the discriminating step that the block data is not normally finished, the complementary data is generated in the complementary data generating step.

According to a thirteenth aspect of the present invention, in the information processing method, when it is determined in the discriminating step that the block data lack in parameters, the necessary number of parameters and a paper ejection command are generated in the complementary data generating step.

According to a fourteenth aspect of the present invention, in the information processing method, when it is determined in the discriminating step that the block data lack in a command ID and parameters, a predetermined command which is not interpreted by the printer, parameters, and a paper ejection command are generated in the complementary data generating step.

According to a fifteenth aspect of the present invention, in the information processing method, an initializing command for setting the printing is further generated in the complementary data generating step.

According to a sixteenth aspect of the present invention, in the information processing method, the print data generating step is a printer driver, and the detecting step and the complementary data generating step are a language monitor.

According to a seventeenth aspect of the present invention, there is provided a computer-readable storage medium which stores a program for controlling an information processing apparatus for communicating with a printer and transmitting and controlling print data under a print environment where a hard reset signal cannot be issued through a predetermined communication medium for software which operates on the OS, wherein the program comprises: a detecting step (step S5 shown in FIG. 5) of, when print data which is generated on the basis of a drawing command is divided on a predetermined unit basis and transmitted to the printer, parsing the divided print data and detecting delimiter information of block data which is transmitted; and a complementary data generating step (step S11 shown in FIG. 5) of, when a print stop command is issued, finishing the block data to be transmitted on the basis of the delimiter information which is detected in the detecting step and generating complementary data to normally finish a printing process of the printer.

According to an eighteenth aspect of the present invention, the program in the storage medium further has a print data generating step (not shown) of receiving the drawing command through the OS and generating the print data comprising commands which can be interpreted by the printer on the basis of the drawing command.

According to a nineteenth aspect of the present invention, the program in the storage medium further has a transmission processing step (step S12 shown in FIG. 5) of transmitting the complementary data generated in the complementary data generating step subsequently to the block data.

According to a twentieth aspect of the present invention, in the program in the storage medium, the complementary data generating step further has a discriminating step (step S5 shown in FIG. 5) of discriminating whether the block data has normally been finished or not on the basis of the delimiter information which is detected in the detecting step, and when it is determined in the discriminating step that the block data is not normally finished, the complementary data is generated in the complementary data generating step.

According to a twenty-first aspect of the present invention, in the program in the storage medium, when it is determined in the discriminating step that the block data lack in parameters, the necessary number of parameters and a paper ejection command are generated in the complementary data generating step.

According to a twenty-second aspect of the present invention, in the program in the storage medium, when it is determined in the discriminating step that the block data lack in a command ID and parameters, a predetermined command which is not interpreted by the printer, parameters, and a paper ejection command are generated in the complementary data generating step.

According to a twenty-third aspect of the present invention, in the program in the storage medium, in the complementary data generating step, an initializing command for setting the printing is further generated.

According to a twenty-forth aspect of the present invention, in the program in the storage medium, the print data generating step is a printer driver, and the detecting step and the complementary data generating step are a language monitor.

DETAILED DESCRIPTION OF THE PREFERRED EMBODIMENTS

An embodiment of the invention will now be described in detail hereinbelow with reference to the drawings.

Figure 1:
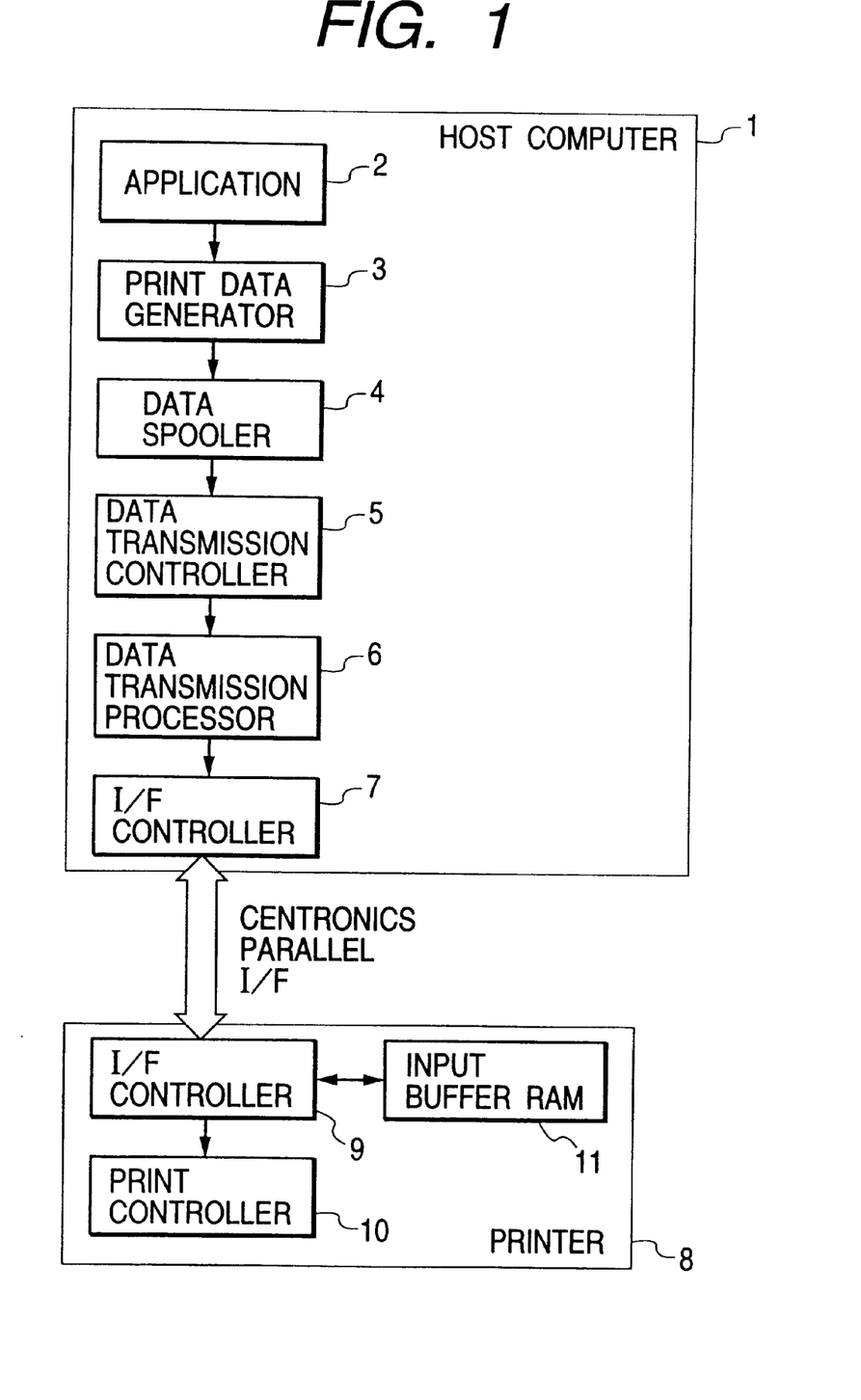
FIG. 1 is a block diagram for explaining a construction of a print processing system to which an information processing apparatus showing an embodiment of the invention can be applied.

FIG. 1 is a block diagram for explaining a construction of a print processing system to which an information processing apparatus showing an embodiment of the invention can be applied and corresponds to a print processing system in which a host computer 1 and a printer 8 can communicate through a bidirectional interface such as a Centronics parallel interface. The interface (I/F) is not limited to the Centronics I/F but can be USB or IEEE1394 I/F. In this case, as for "reset" which is used in the embodiment, a reset command at a protocol level is used in place of a reset signal using a reset signal line of Centronics.

In the host computer 1, reference numeral 2 denotes an application for providing a drawing environment and a printing environment and instructs a print data generator 3 to start the printing. The print data generator 3 receives a drawing function generated by the OS on the basis of figure pattern information drawn by the application 2 and converts it into printer commands which can be interpreted by the printer 8. The print data generator 3 is a module generally called a printer driver.

In more detail, a drawing processor such as a GDI which is provided by the OS is arranged between the application 2 and the print data generator 3 as a printer driver program. The GDI as a drawing processor is a drawing processor in the OS of Windows and performs a process for converting a GDI (Graphic Device Interface) function which is outputted for the OS from the application 2 into a DDI (Device Driver Interface) function suitable for a driver on the output destination side and transmitting it to the printer driver.

Reference numeral 4 denotes a data spooler which is provided by the system. The data spooler receives the print data comprising the printer commands generated by the print data generator 3, divides it into print data blocks each having an arbitrary size, and repetitively issues a data transmission request to a data transmission controller 5. In the embodiment, it is assumed that the data spooler 4 corresponds to an RAW file of Windows and the print data is divided into blocks each having a size of 4 kbytes. In the embodiment, although the spool file is the RAW file, an EMF file of Windows can be used. In this case, the OS forms a file "EMF file" obtained by encoding a drawing command from the application, the contents in the file are converted into a drawing function which can be interpreted by the printer driver, and it is transmitted to the printer driver. Processes after the printer driver are similar but timings for spooling data are different. The invention, however, can be realized by using any spool file. Even when any construction is used, for example, in case of a print job (print data) of 40 kbytes, ten files each comprising 4 kbytes are divisionally outputted ten times one file by one.

The data transmission controller 5 accepts a data transmission request from the data spooler 4, parses the inputted print data blocks, and detects a delimiter of the printer commands. In the embodiment, the data transmission controller 5 corresponds to a language monitor which is provided to a vendor by Windows. When a cancellation is instructed, a delimiter of a command which ought to be generated by the printer driver is detected by the language monitor by parsing the print data block.

Reference numeral 6 denotes a data transmission processor for transmitting the print data block after completion of the parse. Reference numeral 7 denotes an interface controller for managing an I/O unit of the host computer 1.

In the embodiment, a print stop instruction is issued by the application 2 and first transmitted to the print data generator 3 and can be subsequently transmitted to the data spooler 4 and data transmission controller 5 in accordance with this order. Each block can accept the print stop instruction and the block which accepts the print stop can notify the other blocks of the stop of the printing.

In the printer 8, reference numeral 9 denotes an interface controller having a function for actually writing and reading data through a Centronics parallel interface as an external I/F to connect to the host computer 1, and issuing a busy signal to the external I/F under a situation such that the data reception cannot be immediately executed because an input buffer RAM 11 is full of data or the like. The input buffer RAM 11 once stores the data received by the interface controller 9.

Reference numeral 10 denotes a print controller for controlling an engine (not shown) on the basis of the data stored in the input buffer RAM 11 and integratedly controlling the printing process.

Figure 2:
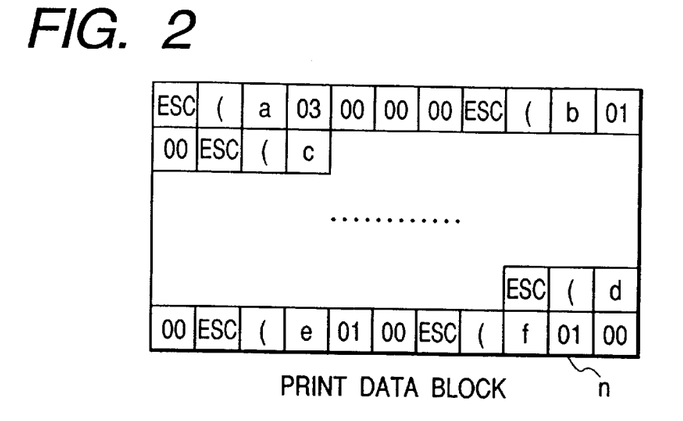
FIG. 2 is a diagram for explaining an example of a print data block which is parsed by a data transmission controller shown in FIG. 1 and its holding data.
Figure 3:
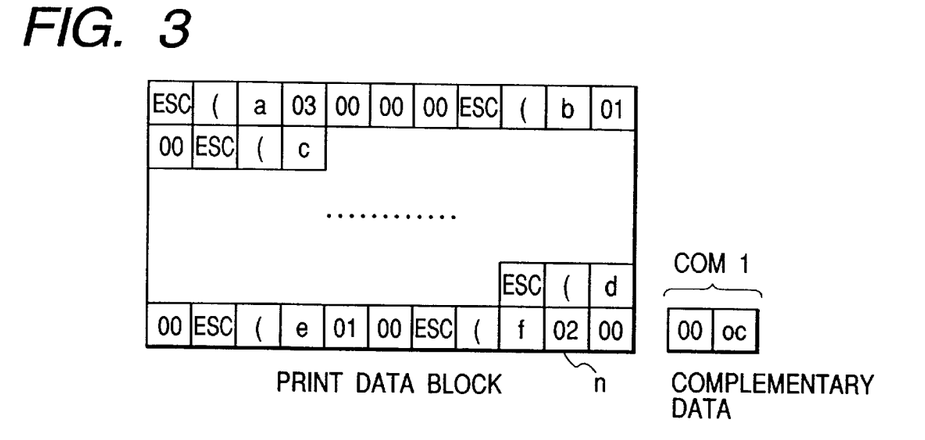
FIG. 3 is a diagram for explaining an example of a print data block which is parsed by the data transmission controller shown in FIG. 1 and its holding data.
Figure 4:
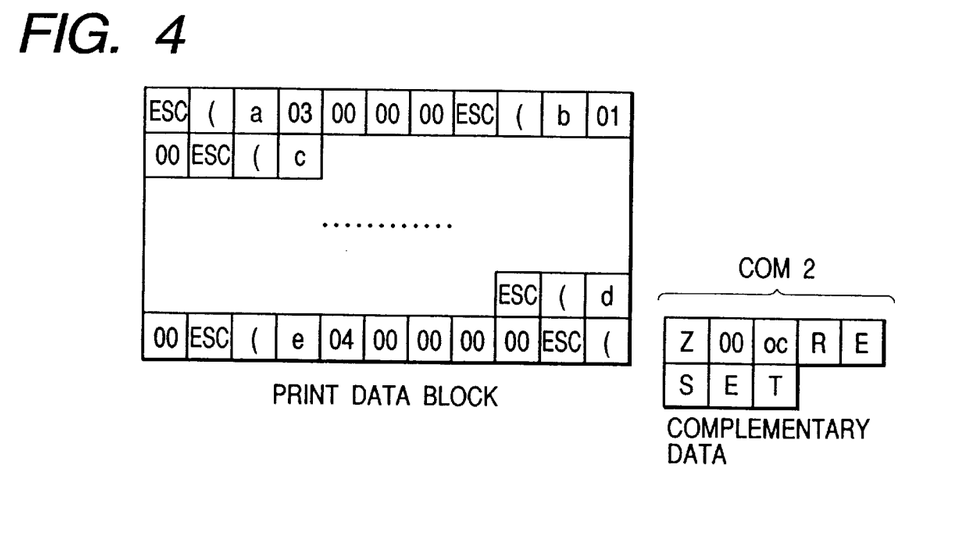
FIG. 4 is a diagram for explaining an example of a print data block which is parsed by the data transmission controller shown in FIG. 1 and its holding data.

FIGS. 2 to 4 are diagrams each for explaining an example of a print data block which is parsed by the data transmission controller 5 shown in FIG. 1 and its holding data. FIG. 2 shows the print data block which is received from the data spooler 4 and corresponds to a case where commands, for example, ESC (x n p1 p2 p3 . . . ) are finished by normal delimiters. Each of FIGS. 3 and 4 shows the print data block which is received from the data spooler 4 and corresponds to a case where commands, for example, ESC (x n p1 p2 p3 . . . ) are finished by delimiters which are not normal.

In the above command example, "ESC" indicates a code (1 byte) showing the head of the command. "(" corresponds to a previous code (1 byte) of a subsequent command ID. "x" corresponds to a command ID (1 byte) represented by a, b, c, or the like in the example. "n" shows a length of subsequent parameters (p1, p2). "p1" shows a parameter 1 (1 byte). "p2" shows a parameter 2 (1 byte). "p3" shows a parameter 3 (1 byte).

Since each of FIGS. 2 to 4 shows the delimiter at a point when the data transmission controller 5 accepts a print end request, this delimiter state is fluctuated as mentioned above.

Particularly, FIG. 2 shows a case where since the length n is equal to "01", the parameters continue by one byte and just coincides with the delimiter of the block. FIG. 3 shows a case where since the length n is equal to "02", the parameters continue by two bytes but the parameters are not finished at the delimiter of the block. In this case, complementary data COM1 is generated and transmitted to the data transmission processor 6 by processes, which will be explained hereinlater. FIG. 4 shows a case where there is a delimiter of the block at a point before the length n, namely, at the command ID and the number of parameters is also obscure. In this case, complementary data COM2 is generated and transmitted to the data transmission processor 6 by processes, which will be explained hereinlater.

The data processing operation in the information processing apparatus according to the invention will now be described hereinbelow with reference to a flowchart shown in FIG. 5.

Figure 5:
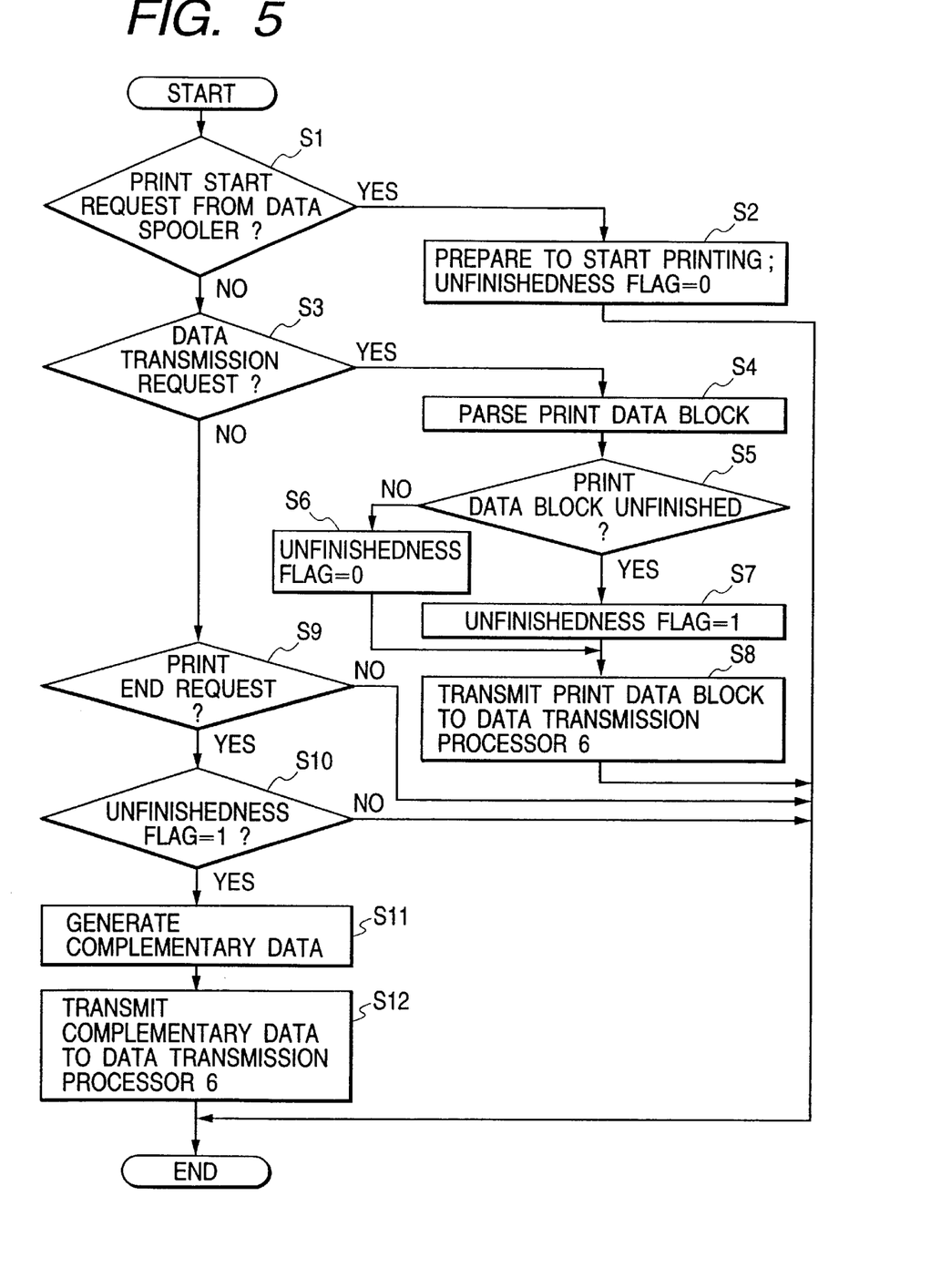
FIG. 5 is a flowchart showing an example of a data processing procedure in the information processing apparatus according to the invention.

FIG. 5 is the flowchart showing an example of a data processing procedure in the information processing apparatus according to the invention. Reference numerals S1 to S12 denote processing steps.

First in step S1, the data transmission controller 5 discriminates whether the present request issued from the data spooler 4 is a "print start request" or not. If it is determined that the present request is the "print start request", an initialization to prepare to start printing is performed in step S2 and the processing routine is finished. In the embodiment, "0" is set into an unfinishedness flag as an initializing operation.

When it is decided in step S1 that the present request is not the "print start request", step S3 follows and whether the present request is a "data transmission request" or not is discriminated. If it is decided that the present request is the "data transmission request", a print data block is parsed in step S4. As a result of parsing, for example, if the parameter length n of the last command included in the print data block is equal to "01" and the parameter of one byte is added at the last position as shown in FIG. 2, since the relevant print data block is finished just at the delimiter of the command, it is determined in step S5 that the print data block is finished. The answer is NO in step S5. "0" is set into the unfinishedness flag in step S6. The processing routine advances to step S8 and subsequent steps.

If the parsed print data block is as shown in FIG. 3, namely, if the parameter length of the last command included in the relevant print data block is equal to "02" and only one byte is added as a last parameter, the relevant print data block is not finished just at the delimiter of the command, so that it is decided in step S5 that the relevant print data block is not finished. The answer in step S5 is YES. The processing routine advances to step S7 and "1" is set into the unfinishedness flag.

Subsequently in step S8, the data transmission controller 5 transmits the parsed print data block to the data transmission processor 6 in order to transmit it to the printer 8. The processing routine is finished.

When it is decided in step S3 that the present request is not the "data transmission request", whether the present request is a "print end request" or not is discriminated in step S9. If it is decided that the present request is not the "print end request", it is determined that the present request is none of the "print start request", "data transmission request", and "print end request". The processing routine is finished.

When it is decided in step S9 that the present request is the "print end request", in step S10, the data transmission controller 5 discriminates whether the unfinishedness flag is equal to "1" or not, namely, whether it is necessary to send the complementary data before the printing is finished or not. If it is determined that the present request is the "print end request", for the data transmission controller 5, it is not always necessary to clearly know whether the "print end request" has finally been issued in the step of normally finishing the printing or whether it has been requested during the print data process in response to the print stop command or not. The operation to generate the complementary data in accordance with the status of the "unfinishedness flag" set in step S2, S6, or S7 and transmit results in that the printing is normally finished.

If it is decided in step S10 that the unfinishedness flag is equal to "1", step S11 follows and the complementary data COM1 shown in FIG. 3 or the complementary data COM2 shown in FIG. 4 is generated.

For example, in FIG. 3, as a result of the parsing, a parameter length of the last command is obtained and the data transmission controller 5 calculates the number of bytes which need to be complemented to finish the command. In case of the print data block shown in FIG. 3, since the parameter length is equal to "02" and "00" and one byte have already been transmitted, the data transmission controller 5 determines that the command is finished by complementing one more byte. The data transmission controller 5 as a language monitor generates the complementary data COM1 in which arbitrary one byte, for example, "00" has been added and, further, for the purpose of ejecting the paper during the feeding operation, one byte of "0C (form feed code)" has been also added.

As shown in FIG. 4, there is a case where the data transmission controller 5 determines that the command ID of the last command in the print data block or the parameter length portion is not included in the print data block. In case of a delimiter which causes such a situation, the data transmission controller 5 as a language monitor adds a command ("Z" in the example shown in FIG. 4) such that it will not exert any influence even if it is transmitted to the printer, perhaps, a command which will be skipped by judging that it is a command which is not supported by the printer, and the parameter length "00", thereby finishing the command. Further, the data transmission controller 5 generates the complementary data COM2 which finishes the command by also adding one byte of "0C (form feed code)" for the purpose of a paper ejection similar to FIG. 3 and, moreover, adding a printer reset command as shown by "RESET" for the purpose of initialization of the printer.

After the complementary data was generated as mentioned above, step S12 follows. The generated complementary data is transmitted to the data transmission processor 6 and the processing routine is finished.

The data transmission processor 6 outputs the print data finished by the protocol according to the I/F designated as a port on the output destination side to such an I/F.

A construction of a data processing program which can be read out by a print system to which the information processing apparatus according to the invention can be applied will now be described hereinbelow with reference to a memory map shown in FIG. 6.

Figure 6:
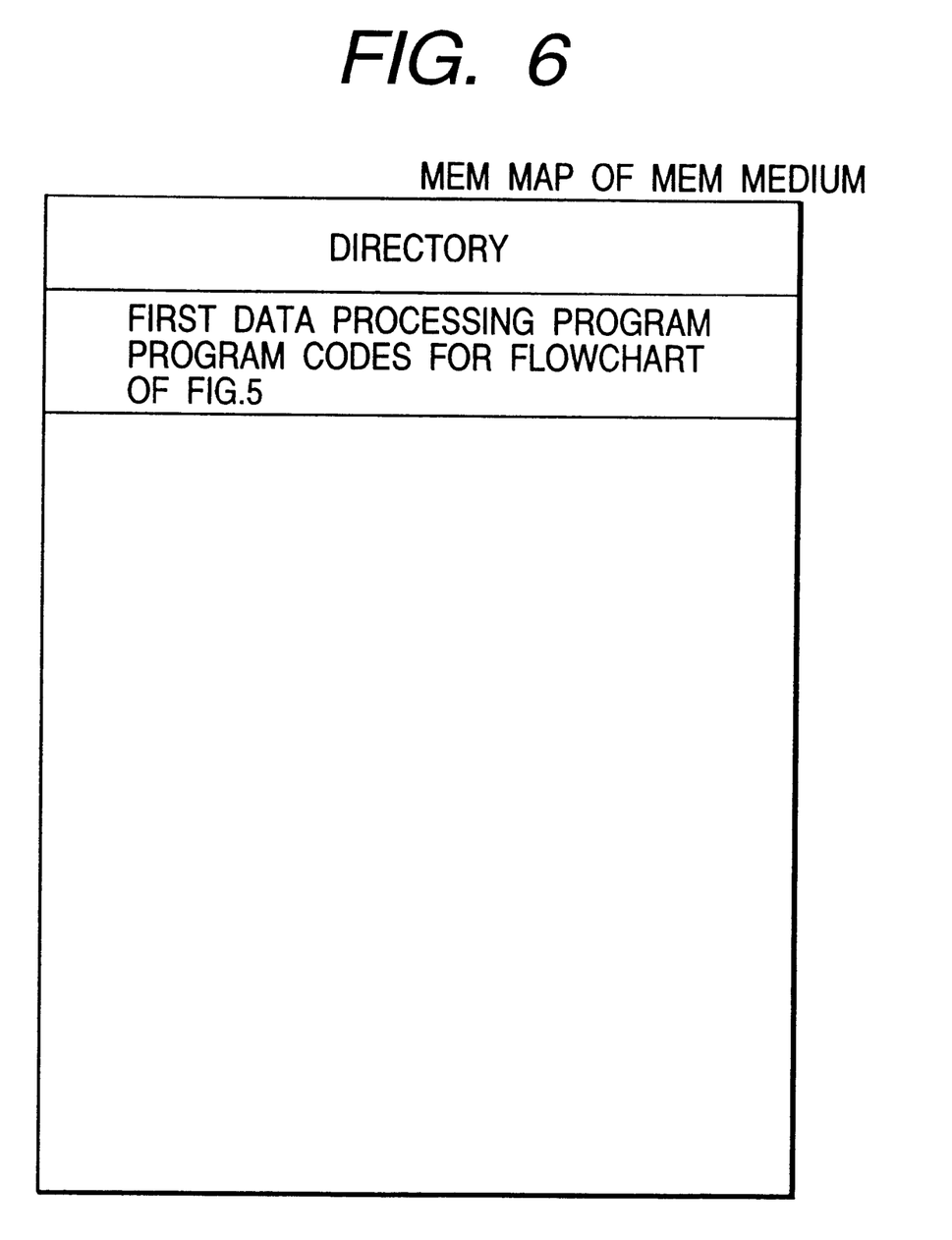
FIG. 6 is a diagram for explaining a memory map of a storage medium to store various data processing programs which can be read out by a print system to which the information processing apparatus according to the invention can be applied.

FIG. 6 is a diagram for explaining the memory map on a storage medium to store various data processing programs which can be read out by the print system to which the information processing apparatus according to the invention can be applied.

Although not particularly shown, there is also a case where information to manage programs stored on the storage medium, for example, version information, persons who made the programs, and the like are also stored and information depending on the OS or the like on the program reading side, for example, icons to identify and display the programs and the like are also stored.

Further, data depending on various programs is also managed in the directory. There is also a case where a program to install various programs into a computer and, if the program to install has already been compressed, a program for decompressing it, and the like are also stored.

The functions shown in FIG. 5 in the embodiment can be executed by a host computer in accordance with a program that is installed from the outside. In this case, the invention can be applied to a case where information group including programs is supplied to an output apparatus from a storage medium such as CD-ROM, flash memory, FD, or the like or from an external storage medium through a network.

It is desirable that the data transmission control program of the language monitor shown in FIG. 5 in the embodiment is installed from the outside onto the storage medium together with the printer driver program as a print data generating program. However, the invention can be applied to a storage medium to install it together with a program to realize the other construction, for example, a storage medium on which it has been stored together with a data dividing program, a data transmitting program, and the like.

The object of the invention can be obviously accomplished by a method such that a storage medium on which the program codes of the software to realize the functions of the foregoing embodiments have been recorded is supplied to a system or an apparatus and a computer (or a CPU or an MPU) of the system or apparatus reads out the program codes stored on the storage medium and executes them.

In this case, the program codes themselves read out from the storage medium realize the novel functions of the invention and the storage medium on which the program codes have been stored constructs the invention.

As a storage medium to supply the program codes, for example, it is possible to use any of a floppy disk, a hard disk, an optical disk, a magnetooptic disk, a CD-ROM, a CD-R, a magnetic tape, a non-volatile memory card, an ROM, an EEPROM, and the like.

The invention also incorporates not only a case where the functions of the foregoing embodiments are realized by executing the read-out program codes by the computer but also a case where the OS (Operating System) or the like which is operating on the computer executes a part or all of the actual processes on the basis of instructions of the program codes, and the functions of the foregoing embodiments are realized by those processes.

Further, the invention also incorporates a case where the program codes read out from the storage medium are written into a memory equipped for a function expanding board inserted in a computer or a function expanding unit connected to the computer and, after that, a CPU or the like equipped for the function expanding board or function expanding unit executes a part or all of the actual processes on the basis of instructions of the program codes, and the functions of the foregoing embodiments are realized by those processes.

As mentioned above, according to the invention, even if a cancellation is instructed in a state where the print data has been spooled by the OS and the data in the spool is deleted, the data transmission controller 5 as a language monitor to obtain the print data from the data spooler 4 discriminates the delimiter of the print data on a unit basis of the data block which is transmitted by the data spooler 4 of the OS and finishes the unfinished data. Thus, even in a system which cannot output a reset signal or a reset command to the printer hardware, after the cancellation upon printing, illegality of the print result of the next printing can be suppressed.

According to the invention as described above, even under an environment where the reset signal cannot be issued, a construction such that the print stop can be realized for the print data during the printing in the printer from the host computer can be provided.

It is also possible to provide a construction which can certainly avoid a situation such that in the case where the print stop process of the print data is performed to the printer in which the print set values which are used are set every print data, the previous set values are taken over for the next print data.

Therefore, there are advantages such that under the environment where the reset signal cannot be issued, it is possible to freely construct an environment where the print stop for the print data during the printing in the printer is shifted to a state where the next print data process can be started without any trouble from the host computer, and the like.

What is claimed is:

1. An information processing apparatus for communicating with a printer and transmitting and controlling print data under a print environment where a hard reset signal cannot be issued through a predetermined communication medium for software that operates on an OS, comprising:

detecting means for, when print data that is generated based on a drawing command is divided on a predetermined unit basis and transmitted to the printer, parsing the divided print data and detecting delimiter information of block data, which is to be transmitted; and complementary data generating means for, when a print stop command is issued based on the delimiter information detected by said detecting means, generating complementary data to finish the block data to be transmitted and to normally finish a printing process of the printer, wherein said complementary data generating means includes discriminating means for discriminating whether the block data has been finished normally or not based on the delimiter information detected by said detecting means, and, when it is determined by the discriminating means that the block data has not been finished normally, said complementary data generating means generates the complementary data.

2. An apparatus according to claim 1, further comprising print data generating means for receiving the drawing command through the OS and generating the print data, which comprises commands that can be interpreted by the printer based on the drawing command.

3. An apparatus according to claim 1, further comprising transmission processing means for transmitting the complementary data generated by said complementary data generating means subsequent to the block data.

4. An apparatus according to claim 1, wherein, when the discriminating means determines that the block data lacks one or more parameters, said complementary data generating means generates a necessary number of parameters and a paper ejection command.

5. An apparatus according to claim 1, wherein, when the discriminating means determines that the block data lacks a command ID and one or more, said complementary data generating means generates a predetermined command, which is not interpreted by the printer, one or more parameters, and a paper ejection command.

6. An apparatus according to claim 3, wherein said complementary data generating means generates an initializing command for setting the printing process.

7. An apparatus according to claim 2, wherein said print data generating means is a printer driver, and said detecting means and said complementary data generating means are part of a language monitor.

8. An information processing method of communicating with a printer and transmitting and controlling print data under a print environment where a hard reset signal cannot be issued through a predetermined communication medium for software that operates on an OS, comprising:

a detecting step of, when print data that is generated based on a drawing command is divided on a predetermined unit basis and transmitted to the printer, parsing the divided print data and detecting delimiter information of block data, which is to be transmitted; and a complementary data generating step of, when a print stop command is issued based on the delimiter information detected in said detecting step, generating complementary data to finish the block data to be transmitted and to normally finish a printing process of the printer, wherein said complementary data generating step includes a discriminating step of discriminating whether the block data has been finished normally or not based on the delimiter information detected in said detecting step, and, when it is determined in the discriminating step that the block data is not been finished normally, said complementary data generating step generates the complementary data.

9. A method according to claim 8, further comprising a print data generating step of receiving the drawing command through the OS and generating the print data, which comprises commands that can be interpreted by the printer based on the drawing command.

10. A method according to claim 8, further comprising a transmission processing step of transmitting the complementary data generated in said complementary data generating step subsequent to the block data.

11. A method according to claim 8, wherein, when it is determined in the discriminating step that the block data lacks one or more parameters, a necessary number of parameters and a paper ejection command are generated in said complementary data generating step.

12. A method according to claim 8, wherein, when it is determined in the discriminating step that the block data lacks a command ID and one or more parameters, a predetermined command, which is not interpreted by the printer, one or more parameters, and a paper ejection command are generated in said complementary data generating step.

13. A method according to claim 11, wherein an initializing command for setting the printing process is generated in said complementary data generating step.

14. A method according to claim 9, wherein said print data generating step is performed by a printer driver, and said detecting step and said complementary data generating step are performed by a language monitor.

15. A computer-readable storage medium storing a program for a method of controlling an information processing apparatus for communicating with a printer and transmitting and controlling print data under a print environment where a hard reset signal cannot be issued through a predetermined communication medium for software that operates on an OS, wherein the method comprises:

a detecting step of, when print data that is generated based on a drawing command is divided on a predetermined unit basis and transmitted to the printer, parsing the divided print data and detecting delimiter information of block data, which is to be transmitted; and a complementary data generating step of, when a print stop command is issued based on the delimiter information detected in said detecting step, generating complementary data to finish the block data to be transmitted and to normally finish a printing process of the printer, wherein said complementary data generating step includes a discriminating step of discriminating whether the block data has been finished normally or not based on the delimiter information detected in said detecting step, and, when it is determined in the discriminating step that the block data is not been finished normally, said complementary data generating step generates the complementary data.

16. A medium according to claim 15, wherein the method further comprises a print data generating step of receiving the drawing command through the OS and generating the print data, which is comprised of commands that can be interpreted by the printer based on the drawing command.

17. A medium according to claim 15, wherein the method further comprises a transmission processing step of transmitting the complementary data generated in said complementary data generating step subsequent to the block data.

18. A medium according to claim 15, wherein, when it is determined in the discriminating step that the block data lacks one or more parameters, a necessary number of parameters and a paper ejection command are generated in said complementary data generating step.

19. A medium according to claim 15, wherein, when it is determined in the discriminating step that the block data lacks a command ID and one or more parameters, a predetermined command, which is not interpreted by the printer, one or more parameters, and a paper ejection command are generated in said complementary data generating step.

20. A medium according to claim 18, wherein an initializing command for setting the printing process is generated in said complementary data generating step.

21. A medium according to claim 16, wherein said print data generating step is performed by a printer driver, and said detecting step and said complementary data generating step are performed by a language monitor.

22. A computer-readable program for implementing a method of controlling an information processing apparatus for communicating with a printer and transmitting and controlling print data under a print environment where a hard reset signal cannot be issued through a predetermined communication medium for software which operates on an OS, wherein the method comprises:

a detecting step of, when print data that is generated based on a drawing command is divided on a predetermined unit basis and transmitted to the printer, parsing the divided print data and detecting delimiter information of block data, which is to be transmitted; and a complementary data generating step of, when a print stop command is issued based on the delimiter information detected in said detecting step, generating complementary data to finish the block data to be transmitted and to normally finish a printing process of said printer, wherein said complementary data generating step includes a discriminating step of discriminating whether the block data has been finished normally or not based on the delimiter information detected in said detecting step, and, when it is determined by the discriminating step that the block data has not been finished normally, said complementary data generating step generates the complementary data.

* * * * *

UNITED STATES PATENT AND TRADEMARK OFFICE
CERTIFICATE OF CORRECTION

PATENT NO. : 6,570,669 B1 Page 1 of 1
DATED : May 27, 2003
INVENTOR(S) : Nobuo Onuma It is certified that error appears in the above-identified patent and that said Letters Patent is hereby corrected as shown below:

Column 5,
Line 5, "twenty-forth" should read -- twenty-fourth --.

Column 7,
Line 51, "The" should read -- If the --; and "step S5. "0"" should read -- step S5, "0" --.
Line 60, "The" should read -- If the --.
Line 61, "YES. The" should read -- YES, the --.

Column 11,
Line 9, "more," should read -- more parameters, --.
Line 42, "is" should read -- has --.

Column 12,
Line 27, "is" should read -- has --.

Signed and Sealed this

Eighteenth Day of November, 2003

JAMES E. ROGAN
*Director of the United States Patent and Trademark Office*